(12) United States Patent
Choby

(10) Patent No.: US 8,585,551 B2
(45) Date of Patent: Nov. 19, 2013

(54) METHOD AND SYSTEM FOR ADAPTIVE CONTINUOUSLY VARIABLE TRANSMISSION GEAR RATIO CONTROL

(75) Inventor: Jordan Choby, Huntington Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 479 days.

(21) Appl. No.: 12/695,093

(22) Filed: Jan. 27, 2010

(65) Prior Publication Data

US 2011/0183810 A1   Jul. 28, 2011

(51) Int. Cl.
*F16H 59/48* (2006.01)
*B60W 10/04* (2006.01)

(52) U.S. Cl.
USPC ............................. 477/120; 477/37; 477/905

(58) Field of Classification Search
USPC ........... 477/37, 115, 120, 121, 132, 133, 143, 477/904, 905
See application file for complete search history.

(56) References Cited

U.S. PATENT DOCUMENTS

| | | | |
|---|---|---|---|
| 3,665,779 A | 5/1972 | Mori | |
| 4,164,876 A | 8/1979 | Peppel | |
| 4,254,998 A | 3/1981 | Marshall et al. | |
| 4,592,565 A | 6/1986 | Eagle | |
| 4,598,611 A | 7/1986 | Frank | |
| 4,601,680 A | 7/1986 | Tokoro et al. | |
| 4,841,815 A | 6/1989 | Takahashi | |
| 4,884,648 A | 12/1989 | Uchida et al. | |
| 4,958,695 A | 9/1990 | Uchida et al. | |
| 5,099,720 A | 3/1992 | Raue | |
| 5,233,523 A | 8/1993 | Follmer | |
| 5,413,541 A | 5/1995 | Nasset | |
| 5,444,307 A | 8/1995 | Sheets et al. | |
| 5,459,658 A | 10/1995 | Morey et al. | |
| 5,717,592 A | 2/1998 | Oo et al. | |
| 5,857,937 A | 1/1999 | Ashizawa et al. | |
| 5,913,916 A | 6/1999 | Bai et al. | |
| 5,947,861 A * | 9/1999 | Nobumoto | 477/37 |
| 5,957,255 A | 9/1999 | Grytzelius | |

(Continued)

FOREIGN PATENT DOCUMENTS

| | | | |
|---|---|---|---|
| EP | 425276 | | 5/1991 |
| JP | 63071437 A | * | 3/1988 |

(Continued)

OTHER PUBLICATIONS

RD 323100.

*Primary Examiner* — Roger Pang
(74) *Attorney, Agent, or Firm* — Snell & Wilmer LLP

(57) ABSTRACT

An automobile comprising a continuously variable transmission ("CVT") system including an acceleration input device, a CVT, and a processor. The acceleration input device generates acceleration input data indicating an amount of change in the acceleration input device, and a rate of change in the acceleration input device. The CVT includes a power source and a transmission output system. The power source operates at a transmission input speed, while the transmission output system operates at a transmission output speed. The transmission input speed over the transmission output speed comprises a gear ratio. The processor analyzes the acceleration input data to determine a target gear ratio. The processor can instruct the CVT to change the gear ratio to the target gear ratio at a rate corresponding to the rate of change in the acceleration input device.

18 Claims, 3 Drawing Sheets

(56) References Cited

U.S. PATENT DOCUMENTS

| | | | |
|---|---|---|---|
| 6,042,196 A | 3/2000 | Nakamura et al. |
| 6,067,493 A | 5/2000 | Adachi et al. |
| 6,076,622 A | 6/2000 | Chakraborty |
| 6,128,565 A | 10/2000 | Tsutsui et al. |
| 6,205,387 B1 | 3/2001 | Ochiai |
| 6,440,037 B2 | 8/2002 | Takagi et al. |
| 6,442,467 B1 | 8/2002 | Schuler et al. |
| 6,461,261 B2 | 10/2002 | Yamamoto et al. |
| 6,466,851 B2 | 10/2002 | Kato et al. |
| 6,478,713 B1 | 11/2002 | Runde et al. |
| 6,496,771 B2 | 12/2002 | Hattori et al. |
| 6,516,260 B2 | 2/2003 | Wetzel et al. |
| 6,516,664 B2 | 2/2003 | Lynam |
| 6,523,911 B1 | 2/2003 | Rupp et al. |
| 6,524,216 B2 | 2/2003 | Suzuki et al. |
| 6,584,391 B2 | 6/2003 | Lack |
| 6,662,098 B2 | 12/2003 | Hellmann et al. |
| 6,668,225 B2 | 12/2003 | Oh et al. |
| 6,726,594 B2 | 4/2004 | Mizuno et al. |
| 6,821,228 B2 | 11/2004 | Aoki et al. |
| 6,823,250 B2 | 11/2004 | Yamaguchi et al. |
| 6,957,139 B2 | 10/2005 | Bellinger |
| 6,968,736 B2 | 11/2005 | Lynam |
| 6,995,663 B2 | 2/2006 | Geisler et al. |
| 7,113,860 B2 | 9/2006 | Wang |
| 7,139,650 B2 | 11/2006 | Lubischer |
| 7,177,743 B2 | 2/2007 | Roy |
| 7,226,134 B2 | 6/2007 | Horn et al. |
| 7,261,672 B2 * | 8/2007 | Frank et al. ............ 477/45 |
| 7,272,481 B2 | 9/2007 | Einig et al. |
| 7,302,332 B2 | 11/2007 | Nenninger |
| 7,303,505 B2 | 12/2007 | Kanafani et al. |
| 7,392,120 B2 | 6/2008 | Matsumoto et al. |
| 7,393,305 B2 | 7/2008 | Yamada et al. |
| 7,447,583 B2 | 11/2008 | Ogawa |
| 7,548,810 B2 | 6/2009 | Aoki |
| 7,568,996 B2 | 8/2009 | Matsui et al. |
| 7,582,041 B2 | 9/2009 | Suzuki et al. |
| 8,133,154 B2 * | 3/2012 | Tao et al. ............ 477/120 |
| 2005/0049772 A1 | 3/2005 | Liu |
| 2005/0051133 A1 | 3/2005 | Persson et al. |
| 2006/0041355 A1 | 2/2006 | Blundell et al. |
| 2006/0261980 A1 | 11/2006 | Beier |
| 2007/0082785 A1 * | 4/2007 | Fukushiro et al. ............ 477/115 |
| 2007/0105691 A1 * | 5/2007 | Sayman et al. ............ 477/121 |
| 2007/0142167 A1 * | 6/2007 | Kanafani et al. ............ 477/37 |
| 2007/0260385 A1 | 11/2007 | Tandy, Jr. et al. |
| 2007/0266700 A1 | 11/2007 | Lang et al. |
| 2008/0027613 A1 | 1/2008 | Bai et al. |
| 2008/0032858 A1 | 2/2008 | Frank et al. |
| 2008/0036296 A1 | 2/2008 | Wu et al. |
| 2008/0147277 A1 | 6/2008 | Lu et al. |
| 2008/0172163 A1 | 7/2008 | Englert et al. |
| 2008/0312030 A1 | 12/2008 | Kurita et al. |
| 2009/0018736 A1 | 1/2009 | Kuwahara |
| 2009/0043468 A1 * | 2/2009 | Kondo et al. ............ 701/61 |
| 2009/0072997 A1 | 3/2009 | Shrum, Jr. |
| 2009/0088938 A1 | 4/2009 | Usukura |
| 2009/0093936 A1 | 4/2009 | Lindgren et al. |
| 2009/0118095 A1 | 5/2009 | Tabata et al. |
| 2009/0157269 A1 | 6/2009 | Matsubara et al. |
| 2009/0219394 A1 | 9/2009 | Heslin |
| 2009/0236159 A1 | 9/2009 | Shibata et al. |
| 2009/0240405 A1 | 9/2009 | Tawara |
| 2009/0250278 A1 | 10/2009 | Kawasaki et al. |

FOREIGN PATENT DOCUMENTS

| | | | |
|---|---|---|---|
| JP | 2-71163 | | 5/1990 |
| JP | 06-270713 | | 9/1994 |
| JP | 09-042444 | | 2/1997 |
| JP | 9144859 A | * | 6/1997 |
| JP | 2000-043705 | | 2/2000 |
| JP | 2000-272381 | | 10/2000 |
| JP | 2001088683 | | 4/2001 |
| JP | 2001-235016 | | 8/2001 |

* cited by examiner

METHOD AND SYSTEM FOR ADAPTIVE CONTINUOUSLY VARIABLE TRANSMISSION GEAR RATIO CONTROL

BACKGROUND

1. Field

The present invention relates to a method and system for adaptive continuously variable transmission gear ratio control.

2. Description of the Related Art

Conventional automobiles containing conventional continuously variable transmission systems change gear ratios based on an amount of depression of an acceleration pedal as indicated by a user. The greater the depression of the acceleration pedal, the greater the gear ratio. Likewise, the less the depression of the acceleration pedal, the lower the gear ratio. The changing of the gear ratios can cause acceleration or deceleration of the automobile.

However, in certain situations the user of the automobile may wish to accelerate more quickly or decelerate more quickly. Yet, in other situations, the user of the automobile may not care if the automobile accelerates quickly or decelerates quickly. Conventional automobiles, however, do not distinguish between either situations, and instead change gear ratios based only on the amount of depression of the acceleration pedal, which results in the automobile changing gear ratios in a less responsive manner to the user. Furthermore, such changing of the gear ratios has the potential to be inefficient and unnecessarily consume fuel.

Thus, there is a need for a method and system for an adaptive continuously variable transmission gear ratio control which is more efficient and responsive to the user.

SUMMARY

The present invention relates to a method and system for an adaptive continuously variable transmission gear ratio control which is more efficient and more responsive to the user. In one embodiment, an automobile can include a continuously variable transmission ("CVT") system including an acceleration input device, a CVT, and a processor. The acceleration input device can generate acceleration input data indicating not only an amount of change in the acceleration input device, but also a rate of change in the acceleration input device.

The CVT can include a power source and a transmission output system. The power source can operate at a transmission input speed, while the transmission output system can operate at a transmission output speed. The transmission input speed over the transmission output speed comprises a gear ratio. In one embodiment, the CVT can be any type of transmission which has a minimum gear ratio, a maximum gear ratio, and can infinitely change gear ratios between the minimum gear ratio and the maximum gear ratio. In another embodiment, the CVT can include an electric motor, a hydraulic pump, gears, belts or any other type of equipment which can allow the CVT to have the minimum gear ratio, the maximum gear ratio and infinitely change gear ratios between the minimum gear ratio and the maximum gear ratio.

The processor analyzes the acceleration input data to determine a target gear ratio and to determine a rate of change in the acceleration input data. The processor can also instruct the CVT to change the gear ratio to a target gear ratio, with a rate of change in the gear ratio corresponding to the rate of change in the acceleration input data.

Thus, the gear ratio changes based on the rate of change in the acceleration input data. Therefore, if the acceleration input data changes quickly, such as if the user is depressing the acceleration input unit quickly or the gear ratio is changed to the target gear ratio quickly. However, if the acceleration input data changes slowly, such as if the user is depressing the acceleration input unit slowly or the gear ratio is changed to the target gear ratio slowly. This can allow a quick acceleration when the user wishes to accelerate quickly and for fuel efficiency when the user does not care if he accelerates quickly. Thus, the present invention is more response to the user's intentions and can also expend fuel more efficiently.

In one embodiment, the present invention is a continuously variable transmission system including a continuously variable transmission operating at a gear ratio, an acceleration input device detecting acceleration input data, and a processor connected to the continuously variable transmission and the acceleration input device, the processor detecting a rate of change in the acceleration input data and changing the gear ratio based on the rate of change in the acceleration input data.

In another embodiment, the present invention is an automobile including a power source operating at a transmission input speed, a transmission output system operating at a transmission output speed, wherein the transmission input speed over the transmission output speed comprise the gear ratio, an acceleration input device detecting acceleration input data, and a processor connected to the power source, the transmission output system, and the acceleration input device, the processor determining a target gear ratio based on the acceleration input data, detecting a rate of change in the acceleration input data, and changing the gear ratio to match the target gear ratio based on the rate of change in the acceleration input data.

In yet another embodiment, the present invention is a method for varying a gear ratio of a continuously variable transmission system including operating a continuously variable transmission at a gear ratio, detecting acceleration input data, detecting a change in the acceleration input data, and changing the gear ratio at a rate based on the rate of change in the acceleration input data.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
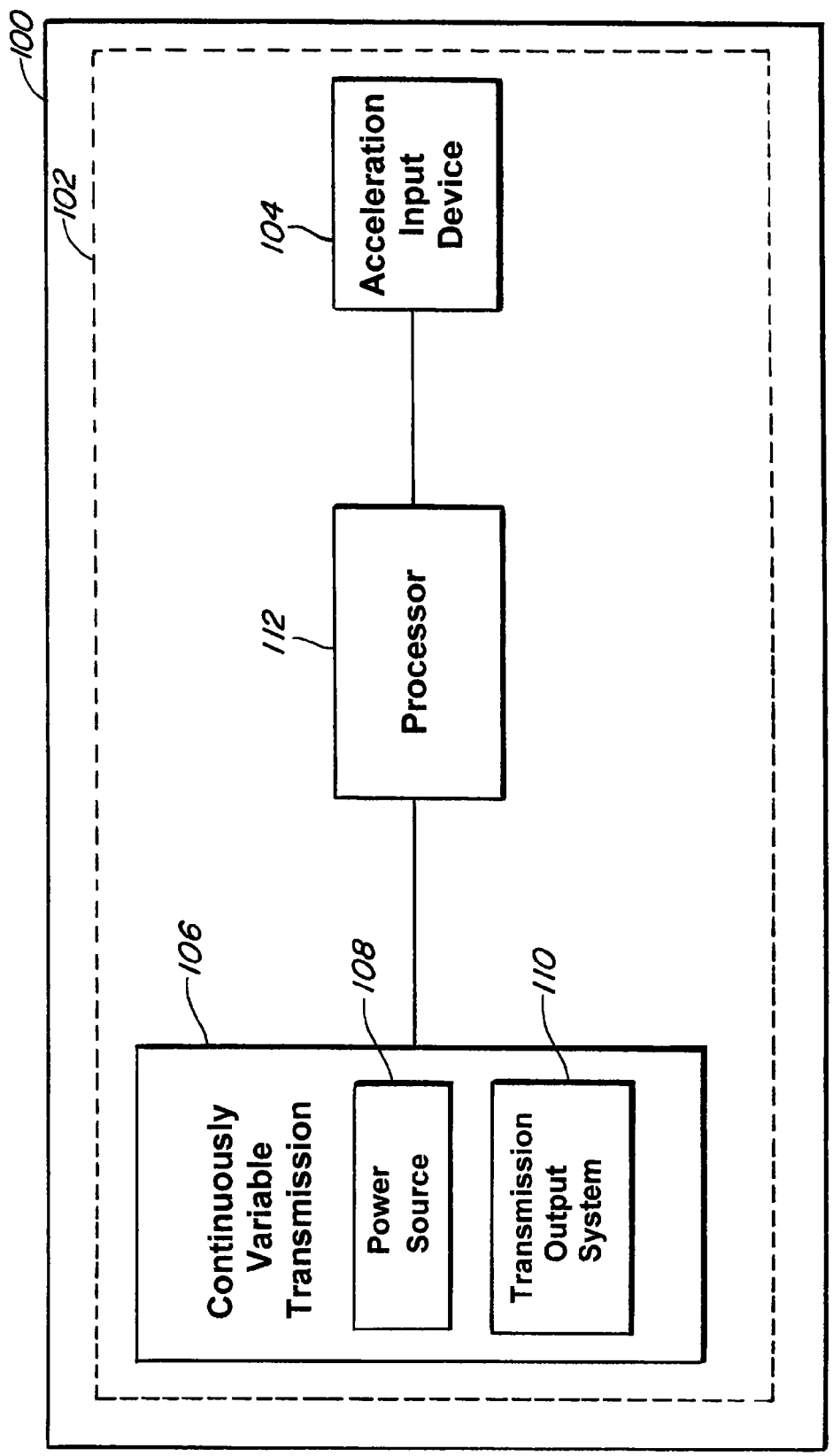
FIG. 1 is an automobile including a continuously variable transmission system according to an embodiment of the present invention.

As seen in FIG. 1, the present invention can include, for example, an automobile 100. The automobile 100 can include, for example, a continuously variable transmission ("CVT") system 102. The automobile 100 can be, for example, an electric automobile, a hybrid automobile, a gasoline automobile, a natural gas automobile, an ethanol automobile, or any other type of motor or engine driven automobile. The CVT system 102 can include an acceleration input device 104, a processor 112, and a CVT 106.

The acceleration input device 104 is connected to the processor 112 and can generate, for example, acceleration input data. The acceleration input device 104 can be, for example, an acceleration pedal and the acceleration input data can indicate, for example, a percent (%) application of the input device 104 and a rate of change in the percent (%) application of the acceleration input device 104. The acceleration input device 104, however, can be any type of device which receives acceleration input data indicating a user's desire to maintain a speed of the automobile 100, decrease the speed of the automobile 100, and/or increase the speed of the automobile 100.

The CVT 106 is connected to the processor 112. The CVT 106 includes, for example, a power source 108 and a transmission output system 110. The power source 108 can be, for example, an engine, a motor, or any other type of system or object which can controllably move the automobile 100. The power source 108 can operate at a transmission input speed. The transmission output system 110 can operate at a transmission output speed.

The transmission input speed over the transmission output speed comprises the gear ratio. Thus changes to the transmission input speed or the transmission output speed can affect the gear ratio. For example, when the transmission output speed remains constant, any increase in the transmission input speed results in an increase in the gear ratio. Likewise, when the transmission output speed remains constant, any decrease in the transmission input speed results in a decrease in the gear ratio. In the previous examples, when the transmission output speed remains constant, any change in the transmission input speed affects the gear ratio. However, as previously noted, the gear ratio can still be changed by changing the transmission input speed, even when the transmission output speed is not constant. In one embodiment, the gear ratio can also be changed by changing the transmission output speed and/or a combination of the transmission input speed and the transmission output speed.

The processor 112 is connected, for example, to the CVT 106 and/or the acceleration input device 104. The processor 112 receives the acceleration input data, determines a target gear ratio, and adjusts the gear ratio in the CVT 106 to match the target gear ratio. Thus, if the target gear ratio is greater than the gear ratio, the processor 112 increases the gear ratio to match the target gear ratio. However, if the target gear ratio is smaller than the gear ratio, the processor 112 decreases the gear ratio to match the target gear ratio.

The processor 112 controls the rate of change in the gear ratio to match the target gear ratio. To determine the rate of change in the gear ratio, the processor 112 analyzes the acceleration input data and determines a rate of change in the acceleration input data. The rate of change in the acceleration input data indicates a rate of change in the acceleration input device 104. The processor 112 sets the rate of change in the gear ratio corresponding to the rate of change in the acceleration input data.

Thus, if the rate of change in the acceleration input data is large, then the rate of change in the gear ratio is large. However, if the rate of change in the acceleration input data is small, then the rate of change in the gear ratio is small. Thus, if the user depresses the acceleration input device 104 quickly, the gear ratio changes quickly to reach the target gear ratio. However, if the user depresses the acceleration input device 104 slowly, the gear ratio changes slowly to reach the same target gear ratio. This can be seen, for example, in FIG. 2 and FIG. 3.

Figure 2:
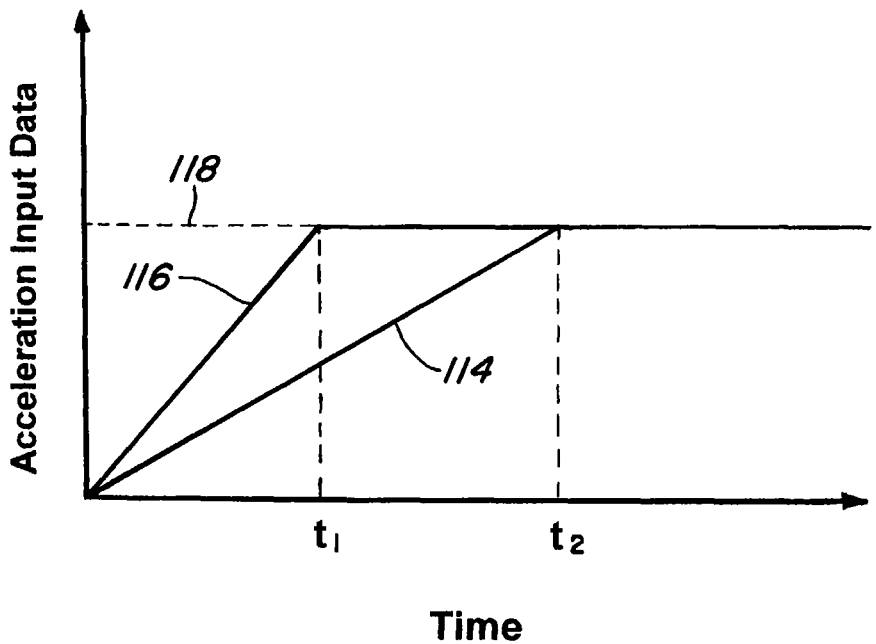
FIG. 2 depicts an acceleration input data graph according to an embodiment of the present invention.

In FIG. 2, curve 114 and curve 116 indicate acceleration input data depicting a percent (%) application of the acceleration input device 104 over time. Line 118 indicates the final value of the percent (%) application of the acceleration input device 104. That is, line 118 represents the final position of the acceleration input device 104 when the user steps on the acceleration input device 104. As can be seen, the user depresses the acceleration input device 104 by the same percentage, but at different rates.

In a first case, as represented by the curve 114, the user depresses the acceleration input until the percent (%) application of the acceleration input device 104 reaches the final position of the acceleration input device 104 represented by line 118. Once the percent (%) application of the acceleration input device 104 reaches the line 118, the user has stopped depressing the acceleration input device 104. In a second case, as represented by the curve 116, the user depresses the acceleration input until the percent (%) application of the acceleration input device 104 reaches the final position of the acceleration input device 104 represented by line 118, but at a faster rate than the first case.

In the first case, the percent (%) application of the acceleration input device 104 reaches the final position indicated by the line 118 at time $t_2$. In the second case, the percent (%) application of the acceleration input device 104 reaches the final position indicated by the line 118 at time $t_1$, which is less than the time $t_2$. Thus, the user depresses the acceleration input device 104 at a faster rate in the second case than in the first case as seen by a comparison of the curves 114 and 116.

Figure 3:
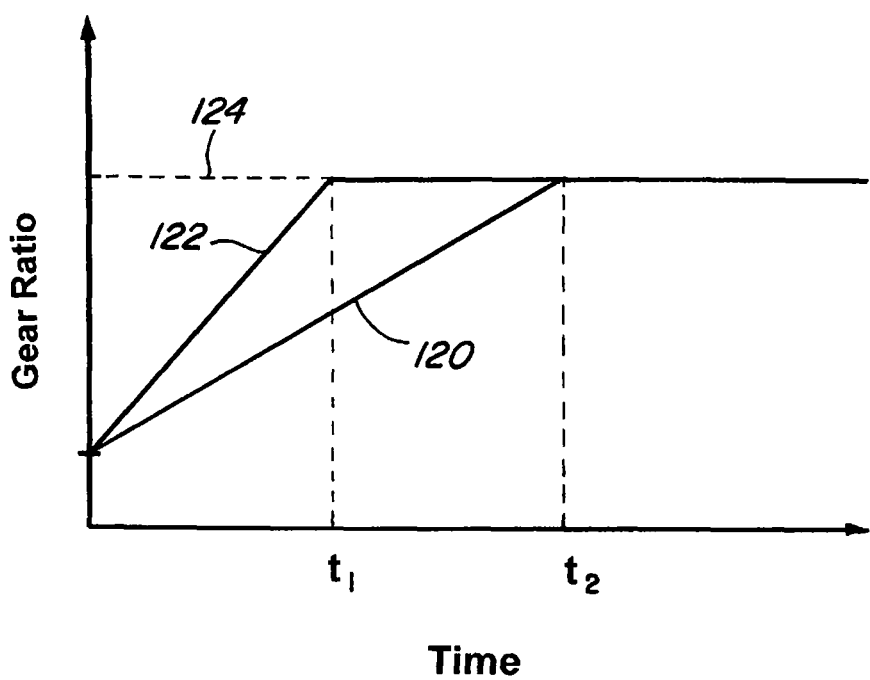
FIG. 3 depicts gear ratios corresponding to various acceleration input data according to an embodiment of the present invention.

The rate of change in the gear ratio corresponds to the rate of change in the percent (%) application of the acceleration input device 104. In FIG. 3, the line 124 represents the target gear ratio. The curve 120 represents the change in the gear ratio corresponding to the first case with an application of the acceleration input device 104 represented by the curve 114 in FIG. 2. The curve 120 reaches the target gear ratio at time $t_2$. The curve 122 represents the change in the gear ratio corresponding to the second case with an application of the acceleration input device 104 represented by the curve 116 in FIG. 2. The curve 122 reaches the target gear ratio at time $t_1$. The time $t_1$ is less than the time $t_2$.

As can be seen, the processor 112 changes the gear ratio at a rate corresponding to the rate of change in the percent (%) application of the acceleration input device 104. Thus, in the curve 122, since the corresponding application of the acceleration input device 104 is faster than in the curve 120, the curve 122 reaches the target gear ratio at time $t_1$, which is less than time $t_2$.

By changing the gear ratio at a rate corresponding to the change in the percent (%) application of the acceleration input device 104, the CVT 106 can be more responsive to the user of the automobile 100. For example, if the user wants to accelerate the automobile 100 quickly, the user typically depresses the acceleration input device 104 more quickly. By changing the gear ratio quickly, the CVT 106 reaches the target gear ratio at a shorter period of time. This allows the CVT 106 to spend more time at the target gear ratio, which is higher than the gear ratio. By spending more time at the target gear ratio, the CVT 106 is providing more torque to the automobile 100 for a longer period of time, which translates to a quicker acceleration for the automobile 100.

Likewise, if the user is nonchalant about accelerating and does not care if the automobile 100 accelerates quickly, or wants to accelerate the automobile 100 slowly, the user typically depresses the acceleration input device 104 slowly. By changing the gear ratio slowly, the CVT 106 reaches the target gear ratio at a longer period of time. This allows the CVT 106 to spend more time reaching the target gear ratio instead of at the target gear ratio, which is higher than the gear ratio.

By spending more time reaching the target gear ratio instead of being at the target gear ratio, the CVT 106 is providing more torque to the automobile 100 for a shorter period of time, which translates to a slower acceleration for the automobile 100. This can also lead to a more efficient operation of the automobile 100 since the automobile 100 can consume less fuel when the user does not want to accelerate quickly. The examples described above are equally applicable to situations where the user wants to decelerate instead of accelerate.

Figure 4:
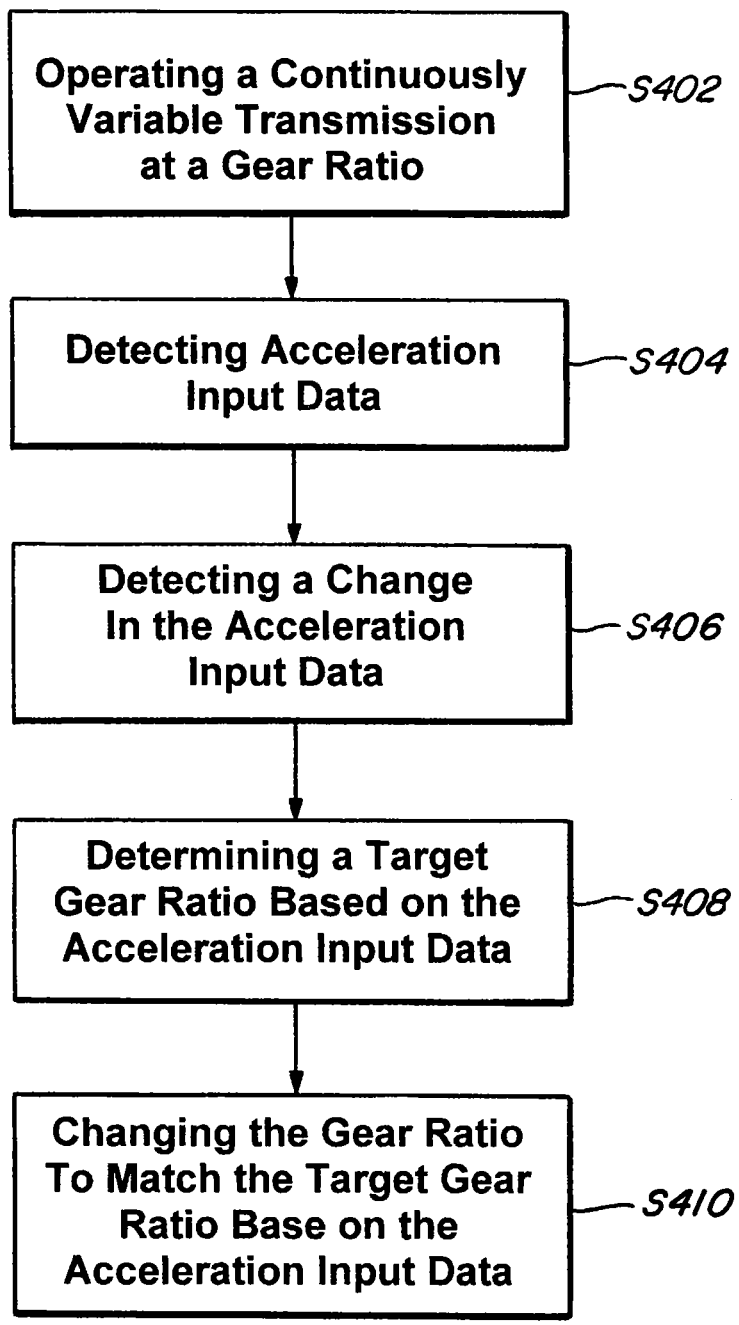
FIG. 4 is a process of varying a gear ratio of a continuously variable transmission system according to an embodiment of the present invention.

In one embodiment, the present invention is a process of varying a gear ratio of a continuously variable transmission system as shown in FIG. 4. In Step S402, a CVT is operated at a gear ratio. For example, the CVT 106 can operate at a gear ratio, which is the transmission input speed of the power source 108 over the transmission output speed of the transmission output system 110. In Step S404, acceleration input data is detected. For example, the acceleration input device 104 can detect acceleration input data. In Step S406, a change in the acceleration input data can be detected. For example, the processor 112 can analyze the acceleration input data and can determine changes in the acceleration input data. Furthermore, the processor 112 can determine a rate of change in the acceleration input data.

In Step S408, a target gear ratio is determined. For example, based on the acceleration input data, the processor 112 can determine the target gear ratio. In Step S410, the gear ratio can be changed to match the target gear ratio based on the acceleration input data. For example, the processor 112 can change the gear ratio at a rate corresponding to the rate of change in the acceleration input data. Thus, if the user is depressing the acceleration input device at a fast rate, the gear ratio will be changed to the target gear ratio at a fast rate. Likewise, if the user is depressing the acceleration input device at a slow rate, the gear ratio will be changed to the target gear ratio at a slow rate.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A continuously variable transmission system comprising:
   a continuously variable transmission configured to operate at a gear ratio;
   an acceleration input device configured to detect acceleration input data corresponding to a percent application of the acceleration input device; and
   a processor connected to the continuously variable transmission and the acceleration input device, the processor configured to determine a rate of change in the percent application of the acceleration input device and continuously change the gear ratio at a rate of change that is substantially equal to the rate of change in the percent application of the acceleration input device throughout an entire spectrum of the rate of change in the percent application of the acceleration input device.

2. The system of claim 1 wherein the processor is configured to determine a target gear ratio such that a rate of change in the target gear ratio is substantially equal to the rate of change in the percent application of the acceleration input device, and the processor is further configured to change the gear ratio to match the target gear ratio.

3. The system of claim 1 wherein the continuously variable transmission includes
  a power source configured to operate at a transmission input speed; and
  a transmission output device configured to operate at a transmission output speed, wherein the transmission input speed over the transmission output speed comprise the gear ratio.

4. The system of claim 1 wherein the continuously variable transmission includes or is coupled to a power source configured to operate at a transmission input speed, and the processor is configured to adjust the rate of change in the gear ratio by changing a rate of change in the transmission input speed to be substantially equal to the rate of change in the percent application of the acceleration input device.

5. The system of claim 4 wherein the processor is configured to increase the transmission input speed at a first rate of increase in the transmission input speed substantially equal to a first rate of increase in the percent application of the acceleration input device, and the processor is further configured to increase the transmission input speed at a second rate of increase in the transmission input speed substantially equal to a second rate of increase in the percent application of the acceleration input device that is is less than the first rate of increase in the percent application of the acceleration input device.

6. An automobile comprising:
  a power source configured to operate at a transmission input speed;
  a transmission output device configured to operate at a transmission output speed, wherein the transmission input speed over the transmission output speed comprise the gear ratio;
  an acceleration input device configured to detect acceleration input data corresponding to a percent application of the acceleration input device; and
  a processor connected to the power source, the transmission output device, and the acceleration input device, the processor configured to determine a rate of change in the percent application of the acceleration input device, determine a target gear ratio such that a rate of change in the target gear ratio is substantially equal to the rate of change in the percent application of the acceleration input data throughout an entire spectrum of the rate of change in the percent application of the acceleration input device, and continuously change the gear ratio throughout the entire spectrum of the rate of change in the acceleration input data to match the target gear ratio.

7. The automobile of claim 6 wherein the processor changes the gear ratio by changing the transmission input speed at a rate of change in the transmission input speed that is substantially equal to the rate of change in the acceleration input data.

8. The automobile of claim 7 wherein the processor is configured to increase the transmission input speed at a first rate of increase in the transmission input speed substantially equal to a first rate of increase in percent application of the acceleration input device, and the processor is configured to increase the transmission input speed at a second rate of increase in the transmission input speed substantially equal to a second rate of increase in the percent application of the acceleration input device that is less than the first rate of increase in the acceleration input.

9. A continuously variable transmission system comprising:
  a continuously variable transmission configured to operate at a gear ratio;
  an acceleration input device configured to detect acceleration input data corresponding to a percent application of the acceleration input device; and
  a processor connected to the continuously variable transmission and the acceleration input device, the processor configured to determine a rate of change in the percent application of the acceleration input device and continuously change the gear ratio at a rate of change that is substantially equal to the rate of change in the percent application of the acceleration input device throughout a majority of an entire spectrum of the rate of change in the percent application of the acceleration input device.

10. The system of claim 9 wherein the processor is configured to determine a target gear ratio such that a rate of change in the target gear ratio is substantially equal to the rate of change in the percent application of the acceleration input device, and the processor is further configured to change the gear ratio to match the target gear ratio.

11. The system of claim 9 wherein the continuously variable transmission includes
  a power source configured to operate at a transmission input speed; and
  a transmission output device configured to operate at a transmission output speed, wherein the transmission input speed over the transmission output speed comprise the gear ratio.

12. The system of claim 9 wherein the continuously variable transmission includes or is coupled to a power source configured to operate at a transmission input speed, and the processor is configured to adjust the rate of change in the gear ratio by changing a rate of change in the transmission input speed to be substantially equal to the rate of change in the percent application of the acceleration input device.

13. The system of claim 11 wherein the processor is configured to increase the transmission input speed at a first rate of increase in the transmission input speed substantially equal to a first rate of increase in the percent application of the acceleration input device, and the processor is further configured to increase the transmission input speed at a second rate of increase in the transmission input speed substantially equal to a second rate of increase in the percent application of the acceleration input device that is less than the first rate of increase in the percent application of the acceleration input device.

14. A continuously variable transmission system comprising:
  a continuously variable transmission configured to operate at a gear ratio;
  an acceleration input device configured to detect acceleration input data corresponding to a percent application of the acceleration input device that increases during a first time period and remains substantially constant during a second time period; and
  a processor connected to the continuously variable transmission and the acceleration input device, the processor configured to determine a rate of change in the percent application of the acceleration input device and continuously change the gear ratio at a rate of change that is substantially equal to the rate of change in the percent application of the acceleration input device throughout the first time period and the second time period.

15. The system of claim 14 wherein the processor is configured to determine a target gear ratio such that a rate of change in the target gear ratio is substantially equal to the rate of change in the percent application of the acceleration input device throughout the first time period and the second time period, and the processor is further configured to change the gear ratio to match the target gear ratio.

16. The system of claim 14 wherein the continuously variable transmission includes
   a power source configured to operate at a transmission input speed; and
   a transmission output device configured to operate at a transmission output speed, wherein the transmission input speed over the transmission output speed comprise the gear ratio.

17. The system of claim 14 wherein the continuously variable transmission includes or is coupled to a power source configured to operate at a transmission input speed, and the processor is configured to adjust the rate of change in the gear ratio by changing a rate of change in the transmission input speed to be substantially equal to the rate of change in the percent application of the acceleration input device.

18. The system of claim 16 wherein the processor is configured to increase the transmission input speed at a first rate of increase in the transmission input speed substantially equal to a first rate of increase in the percent application of the acceleration input device, and the processor is further configured to increase the transmission input speed at a second rate of increase in the transmission input speed substantially equal to a second rate of increase in the percent application of the acceleration input device that is less than the first rate of increase in the percent application of the acceleration input device.

* * * * *